(12) United States Patent
Amitai (10) Patent No.: US 7,006,266 B2
(45) Date of Patent: Feb. 28, 2006

(54) OPTICAL SWITCHING DEVICES (75) Inventor: Yaakov Amitai, Rehovot (IL)

(73) Assignee: EL-OP Electro-Optics Industries Ltd., Rehovot (IL)

( * ) Notice: Subject to any disclaimer, the term of this patent is extended or adjusted under 35 U.S.C. 154(b) by 0 days.

(21) Appl. No.: 10/398,242

(22) PCT Filed: Oct. 4, 2001

(86) PCT No.: PCT/IL01/00928

§ 371 (c)(1),
(2), (4) Date: Apr. 3, 2003

(87) PCT Pub. No.: WO02/29486

PCT Pub. Date: Apr. 11, 2002

(65) Prior Publication Data

US 2004/0032660 A1   Feb. 19, 2004

(30) Foreign Application Priority Data

Oct. 5, 2000   (IL)   ................................ 138895

(51) Int. Cl.
G02B 5/32      (2006.01)
G03H 1/00      (2006.01)
G03H 1/04      (2006.01)
(52) U.S. Cl. .................... 359/15; 359/34; 359/900
(58) Field of Classification Search ............. 359/15, 359/34, 900; 385/14, 15, 16, 17, 24, 37
See application file for complete search history.

(56) References Cited

U.S. PATENT DOCUMENTS 4,946,253 A * 8/1990 Kostuck ................. 359/15
5,363,228 A * 11/1994 DeJule et al. ............. 398/45
5,422,746 A * 6/1995 Aharoni et al. ........... 359/16
5,430,561 A * 7/1995 Kato et al. ............... 349/202
5,486,934 A * 1/1996 Huang .................... 359/15

OTHER PUBLICATIONS

Yang-Tung Huang, "Polarization-independent optical switch composed of holographic optical elements", Optics Letters, vol. 20, No. 10, pp. 1198-1200, May 15, 1995.*
A.V. Krishnamoorthy, et al., "Polarization-controlled multistage switch based on polarization-selective computer-generated holograms", Applied Optics, vol. 36, No. 5, pp. 997-1010, Feb. 10, 1997.*
Jen-Tsorng Chang, et al., "Substrate-mode holographic polarization-division multi/demultiplexer for optical communications", Appl. Optics, vol. 33, No. 35, pp. 8143-8145, Dec. 10, 1994.*
Masayuki Kato, et al., "Multichannel optical switch that uses holograms", Optics Lett. vol. 17, No. 11, pp. 769-771, Jun. 1, 1992.*
Jang-Hun Yeh, et al., "Substrate-mode holograms used in optical interconnects: design issues", Applied Optics, vol. 34, No. 17, pp. 3152-3164, Jun. 10, 1995.*

(Continued)

Primary Examiner—John Juba, Jr.
(74) Attorney, Agent, or Firm—Connolly Bove Lodge & Hutz LLP (57) ABSTRACT The invention provides an optical switcing device, including a substrate having at least one polarization-selective multiplexing grating; at least one polarization-selective demultiplexing grating, and a polarization rotation element acting as a dynamic ½ λ plate, optically interposed between the optical path of said multiplexing grating and said demultiplexing grating. The invention also provides a method for producing an holographic plate having a plurality of holographic elements.

15 Claims, 6 Drawing Sheets

OTHER PUBLICATIONS

R.K. Kostuk, et al., "Polarization properties of substrate-mode holographic interconnects", Applied Optics, vol. 29, No. 26, pp. 3848-3854, Sep. 10, 1990.*

R.K. Kostuk, et al., "Reducing alignment and chromatic sensitivity of holographic optical interconnects with substrate-mode holograms", Applied Optics, vol. 28, No. 22, pp. 4939-4944, Nov. 15, 1989.*

Huang et al., Optical switches with a substrate-mode grating structure, Optik, 98(1994) Nov., No. 1, Stuttgart, DE.

* cited by examiner

Fig. 7.
Bottom plate-before switching

Fig. 8.
Top plate-after switching

OPTICAL SWITCHING DEVICES

FIELD OF THE INVENTION

The present invention relates to optical switching devices. More particularly, the invention concerns reconfigurable optical switching devices for forming a switching system.

BACKGROUND OF THE INVENTION

One of the main components needed for optical interconnections is a dynamic switch. In order to make such a switch compatible with a planar interconnection system, it must be as compact as possible. It is preferable that the switch be an integral part of the planar optical system; that is, the switching should be effected within the planar substrate. Furthermore, the process of fabricating the dynamic switch must be simple enough so as to ensure that the entire system is suitable for mass production.

DISCLOSURE OF THE INVENTION

It is a broad object of the present invention to provide an optical switching device based on polarization-selective holographic elements.

A further object of the present invention is to provide an architecture for an optically dynamic switching system.

A still further object of the invention is to provide a method for producing an holographic plate having a plurality of holographic elements.

In accordance with the present invention, there is therefore provided an optical switching device, comprising a substrate having at least one polarization-selective multiplexing grating; at least one polarization-selective demultiplexing grating, and a polarization rotation element acting as a dynamic ½ λ plate, optically interposed between the optical path of said multiplexing grating and said demultiplexing grating.

The invention further provides a method for producing an holographic plate having a plurality of holographic elements, said method comprising the steps of (a) defining a first intermediate holographic element; (b) defining a second intermediate holographic element located at the plane parallel to the plane of said first holographic element; (c) determining, for each holographic element, a pair of parent holograms to be formed on said intermediate elements in such a way that combining said pair of parent holograms with a pre-defined readout wave will yield two coherent light waves wherein the interference of said two light waves in said holographic plate produces the desired final holographic effect; (d) determining the signs of the x components of the projections from the paraxial rays of said pairs of parent holograms for all of the holographic elements on said holographic plate; (e) dividing said holographic elements into two groups according to the signs of said x components; (f) producing, for each of said two groups, a different holographic plate comprising the parent holograms of the relevant holographic elements; (g) attaching the plates produced in step (f) to an optical prism in such a way that while illuminating said plates through the prism with said predetermined readout wave, the first diffracted order from the intermediate hologram produces the desired holographic effect on the holographic plates, the zero order is coupled out of the prism by total internal reflections, and the other orders are evanescent waves; and (h) repeating the recording process for each group of holographic elements as defined in steps (d) and (e).

BRIEF DESCRIPTION OF THE DRAWINGS

The invention will now be described in connection with certain preferred embodiments with reference to the following illustrative figures, so that it may be more fully understood.

With specific reference now to the figures in detail, it is stressed that the particulars shown are by way of example and for purposes of illustrative discussion of the preferred embodiments of the present invention only, and are presented in the cause of providing what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice.

In the drawings.

DETAILED DESCRIPTION OF PREFERRED EMBODIMENTS

Figure 1:
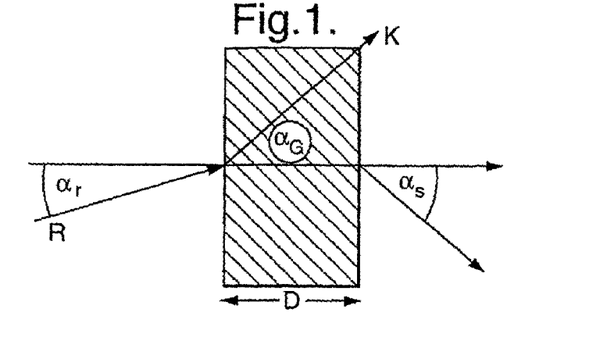
FIG. 1 is a schematic illustration of a thick phase transmission hologram.

The diffraction efficiency of a thick phase transmission hologram (FIG. 1) is given by the expression:

$$\eta = \frac{\sin^2\sqrt{\varphi^2 + \psi^2}}{1 + \frac{\psi^2}{\varphi^2}} \quad (1)$$

in which the Bragg deviation coefficient ψ is defined as $$\psi \equiv \frac{(\alpha_r - \alpha_r^B)\vec{K}D\sin(\alpha_G - \alpha_r^B)}{2\cos\alpha_s} - \frac{(\lambda - \lambda^B)\vec{K}^2 D}{8\pi v \cos\alpha_s}, \quad (2)$$

wherein:
$\vec{K}$ is the three-dimensional grating function of the hologram;
D is the thickness of the emulsion,
$\alpha_r$, $\alpha_s$, and $\alpha_G$, are the off-axis angles of the readout wave, signal wave, and the grating function, respectively;
$\lambda$ and $\lambda^B$ are the actual and the designed readout wavelengths, and
$\alpha_r^B$ is the off-axis angle of the designed readout wave.
The grating coupling coefficient is defined as $$\varphi_s = \frac{\pi v_1 D}{\lambda \sqrt{\cos\alpha_s \cos\alpha_r}} \quad (3)$$

for s-polarization, and as $$\phi_p = -\phi_s(\bar{r}\cdot\bar{s}) \quad (4)$$

for p-polarization, wherein:
$v_1$ is the maximum phase modulation of the refraction index of the emulsion, and
$\bar{r}$ and $\bar{s}$ are the unit vectors of the readout and the signal rays respectively.
Fulfilling Bragg conditions (namely, ψ=0) yields $$\eta_{s,p} = \sin^2(\phi_{s,p}). \quad (5)$$

It is clear from Equation (4) that, for an off-axis hologram, the coupling coefficient for the p polarization is smaller than that for the s polarization. Consequently, it can be deduced from Equation (5) that the diffraction efficiencies of the s and p polarizations will be different, as a function of the obliquity of the hologram.

Figure 2:
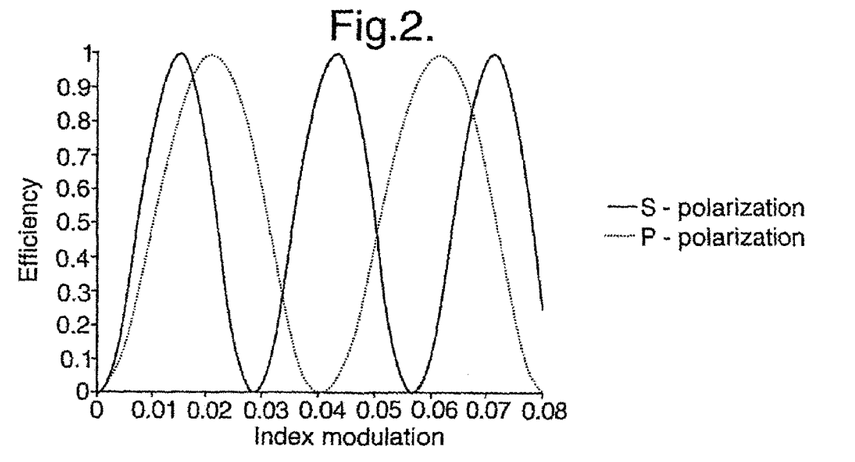
FIG. 2 is a graph showing the diffraction efficiencies of the s and p polarizations of a transmission thick phase hologram.

FIG. 2 illustrates the diffraction efficiencies of the s and p polarizations of a hologram having the following parameters:

$$D=15 \, \mu m; \, \alpha_r=0; \, \alpha_s=45°; \, \lambda=850 \, nm; \, v=151 \quad (6)$$

where v is the refractive index. It is important to emphasize that the angle $\alpha_s$ is inside the emulsion; consequently, the signal wave is trapped inside the substrate due to total internal reflection.

Fabrication of an holographic element which is very efficient for one polarization and, at the same time, is actually transparent to the other, is possible with a variety of methods. Such an element is necessary for polarization multiplexing or demultiplexing. There are two distinct approaches that exploit the special behavior of a Bragg hologram when the signal wave is normal to the readout wave within the emulsion:

1. The "Normal-Waves" Approach

Suppose that the holographic element is recorded in such a geometry that the signal wave is normal to the readout wave during the readout process. In this case, the unit vector of these two waves fulfill the condition:

$$\bar{r}\cdot\bar{s}=0. \quad (7)$$

Inserting Equation (7) inside Equation (4) yields $$\phi_p=0 \Rightarrow \eta_p=0. \quad (8)$$

This result, that the diffraction efficiency of the p polarization is zero, does not depend on parameters which are difficult to precisely control, such as index modulation or emulsion thickness, but depends only on the readout geometry which is much easier to achieve with good accuracy.

Figure 3:
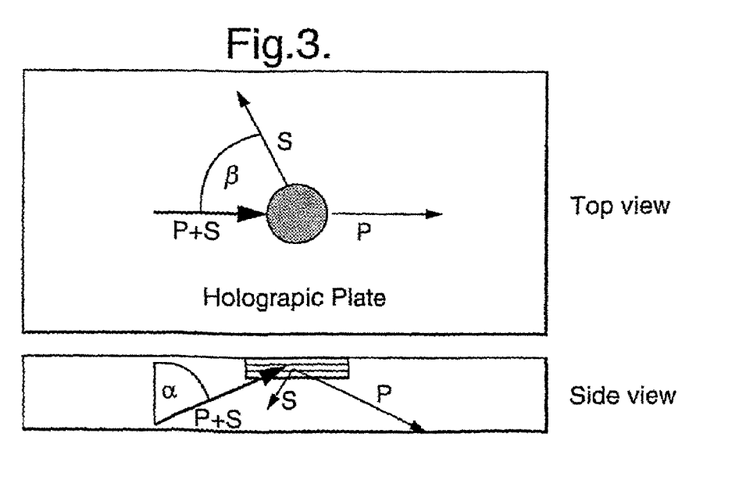
FIG. 3 is a schematic illustration showing top and side views of a first embodiment of a building block of a dynamic switching device according to the present invention.

FIG. 3 illustrates the building block of the "three-dimensional" version. As shown, the readout wave bounces inside the substrate with an off-axis angle α to the normal of the substrate plane. The holographic element diffracts the incoming wave in such a way that the bouncing angle remains α, but there is an angle β between the projections of the readout and the signal waves in the substrate plane.

In order to achieve the necessary condition of $\bar{r}\cdot\bar{s}=0$, the following equation:

$$\cos \beta = \cot^2 \alpha \quad (9)$$

must be satisfied. Clearly, Equation (9) imposes the following constraint upon the bouncing angle inside the substrate:

$$\alpha_{min}=45°. \quad (10)$$

A direct result of Equation (10) is that, even for substrate materials with low indices of refraction, such as BK-7 and other crown materials, the optical waves are trapped inside the substrate by total internal refraction and there is no need for a reflective coating on the substrate surfaces. Unfortunately, in order to couple the waves into the substrate with an off-axis angle higher than 45°, a holographic element with very high special frequency would be required (more than 1200 line-pairs/mm for λ=850 nm). This would indicate that the only practical way to realize the hologram is by interferometric recording, and that it will be very difficult to fabricate it by direct writing or lithographic methods.

A possible way of recording the desired hologram is to use an off-axis angle of α=60°. For example, inserting this value into Equation (10) yields $$\beta=70.5°. \quad (11)$$

Figure 4:
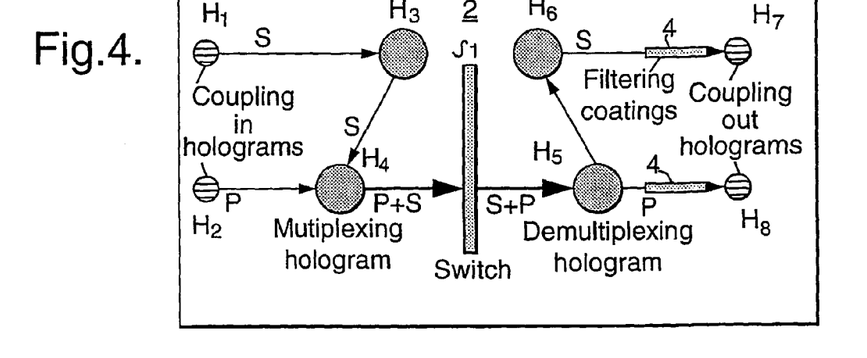
FIG. 4 schematically illustrates a first embodiment of the geometry of an entire optical switching device according to the present invention.

As shown in FIG. 4, two light waves s and p, of orthogonal polarization, are coupled into the substrate 2 by coupling means such as the holograms $H_1$ and $H_2$, respectively. The hologram $H_3$ diffracts the s in a direction so as to join it onto p. $H_4$ is the multiplexing hologram, which is shown and described with reference to FIG. 3. $H_4$ is very efficient to s polarization and is actually transparent top polarization. Here, it does not effect p, but rather, it diffracts s into the same direction of p. As a result, p and s are multiplexed together into a single optical wave which illuminates the dynamic switch. Instead of the holograms, other coupling means, such as reflective surfaces or prisms, can be utilized.

After passing through the switch S, which either rotates the polarizations by 90° (operation mode) or has no influence upon the waves (non-operation mode), the waves meet the demultiplexing hologram $H_5$, which is identical to $H_4$ but to the opposite effect; that is, it separates p and s into different directions. $H_6$, which is an optional hologram, rotates s so that it becomes parallel to p in the substrate. The final holograms, $H_7$ and $H_8$, couple the light waves back out of the substrate onto the detectors. In order to minimize the cross-talk between the channels, special coating facets 4 may be added onto the surface of the substrate, to filter out the s-polarization from the p channel and vice-versa.

There are clear advantages to the switch shown in FIG. 4. Its dimensions can be very compact, it can be easily integrated into the planar optical interconnection scheme, it is appropriate for multi-stage devices, and finally, it has the potential to provide very high efficiency and negligible cross-talk between the channels. The device does, however, have some drawbacks: as described above, the switch can be realized only with interferometrically recorded Bragg holograms. Also, the recording process of holograms $H_5$ and $H_6$ is very complicated, and in addition, since the waves pass through the switch while bouncing inside the substrate at an oblique, off-axis angle, a special SLM, or similar device, must be fabricated in order to perform the desired polarization rotation in the correct fashion.

Figure 5:
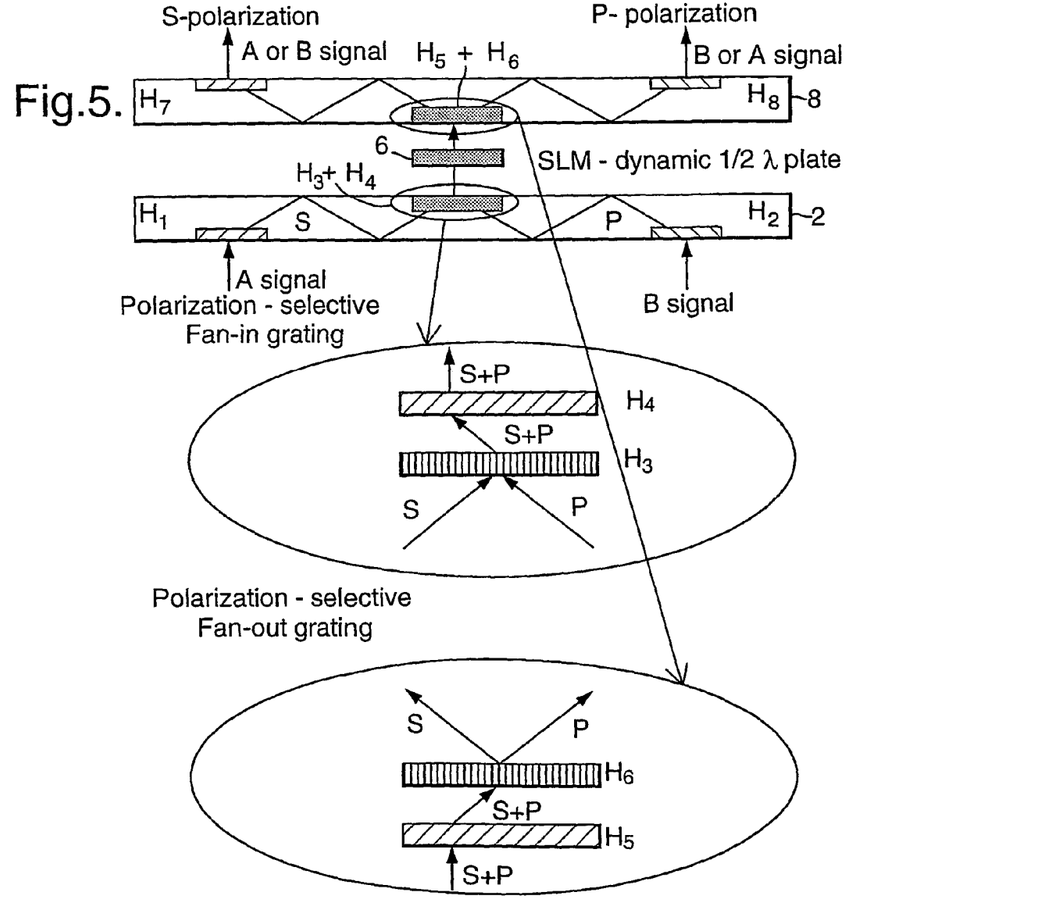
FIG. 5 schematically illustrates a cross-sectional view of a further embodiment of the geometry of an entire optical switching device.

FIG. 5 illustrates the building block of a "two-tier" version. As with the two-dimensional embodiment of FIG. 4, the holograms $H_1$ and $H_2$ couple the input waves into the substrate 2, but here the off-axis angle of wave propagation inside the substrate is set at 45°. The waves are multiplexed together by the hologram $H_3$. Since the angle of the direction of propagation between the two waves is 90°, the hologram will be very efficient with respect to wave A and practically transparent with respect to wave B. The next hologram, $H_4$, couples the waves out of the first substrate 2. The waves then illuminate an SLM 6, which acts as a dynamic ½ λ plate, normal to its surface. After passing through SLM 6, the waves are coupled into a second substrate 8 by the hologram $H_5$. The next hologram, $H_6$, is the demultiplexing grating that diffracts the s polarization by 90°. The final holograms $H_7$ and $H_8$ couple the light back out of the substrate onto detectors (not shown). Clearly, the two substrates 2 and 8, and the SLM, can be easily integrated into one piece, to minimize the overall size of the device.

The embodiment of the optical switch shown in FIG. 5 can also be very compact, is appropriate for multi-stage devices, and has the potential to provide very high efficiency and negligible cross-talk between the channels. In addition, it has some additional advantages over the embodiment of FIG. 4: with slight modification of the geometry, not only Bragg holograms, but also surface-relief gratings, can be used as the multiplexing/demultiplexing devices. This is a fairly simple process of recording the holograms, and furthermore, since the waves illuminate the SLM in a direction normal to its surface, a commercially available SLM 6 can be used as the dynamic ½ λ plate.

There are still some drawbacks to the embodiment of FIG. 5. First, the fan-in and fan-out gratings are each combined from a different pair of holograms ($H_3$-$H_4$ and $H_5$-$H_6$, respectively). The holograms in each pair must be recorded separately on two different emulsion layers. This can be done either by recording the first layer, then adding a second emulsion layer and then making the next recording step, or alternatively, by recording two separate substrates and then combining them together. In both cases, the procedure is long, cumbersome and not very suitable for mass production.

The second area of concern is the geometry of the proposed switch. As can be seen in FIG. 5, the projection of the output waves, after they are separated by the fan-out gratings, is identical to the projection of the incoming waves. This constraint imposes a limit upon the feasibility of using the switch in a multi-stage architecture. Moreover, there are two differently-polarized waves inside the substrate having s and p polarizations. It is desirable, for the sake of achieving minimal cross-talk to filter undesired polarizations from the signals. This can be done with a simple coating for a single substrate, but is impossible to perform for two orthogonal polarizations.

2. The "Different Coupling Coefficients" Approach

As can be seen in FIG. 2, one method to achieve polarization separation is by choosing parameters whereby the efficiency of one polarization is 0 and that of the second is close to 100%. For example, a holographic element with the parameters described in Equation (6), and wherein the index modulation is $vv_1$=0.041, has diffraction efficiencies of 0 for the p polarization and 95% for the s polarization. It is comparatively easy to record this hologram for achieving the necessary polarization separation. In the following, how to calculate the exact conditions required for optimal polarization separation is shown.

For a diffraction angle smaller than 90°, there are two cases in which the hologram can perform a highly polarization-selective property:

$$\eta_s=100\% \text{ and } \eta_p=0 \Rightarrow \phi_s=(n+0.5)\pi \text{ and } \phi_p=n\pi \tag{12}$$

or $$\eta_s=0\% \text{ and } \eta_p=100\% \Rightarrow \phi_s=n\pi \text{ and } \phi_p=(n-0.5)\pi \tag{13}$$

wherein:

n is a natural number.

In our particular case, we have the readout condition $$\alpha_r=0° \Rightarrow \cos \alpha_r=1. \tag{14}$$

Therefore, the coupling coefficients ϕ become $$\varphi_s = \frac{\pi v_1 D}{\lambda \sqrt{\cos \alpha_s}}, \tag{15}$$

$$\varphi_p = \frac{\pi v_1 D}{\lambda} \sqrt{\cos \alpha_s}. \tag{16}$$

Substituting the values of $\phi_s$ in Equation (15) and $\phi_p$ in Equation (16) into Equation (12) yields $$\frac{\pi v_1 D}{\lambda \sqrt{\cos \alpha_s}} = n + 0.5; \frac{\pi v_1 D}{\lambda} \sqrt{\cos \alpha_s} = n. \tag{17}$$

Solving Equation (17) yields $$\alpha_s = \arccos \frac{n}{n + 0.5}; \frac{v_1 D}{\lambda} = \sqrt{n(n + 0.5)}. \tag{18}$$

To illustrate the calculations, for the values of n=1, λ=830 nm, and D=17 mm, the desired phase modulation of the refractive index of the substrate is $v_1$=0.06, which can easily be achieved using recording materials such as DCG or photopolymer. The off-axis angle inside the substrate is $\alpha_s$=48.2°.

Using similar algebraic manipulations for Equation (13) yields another solution:

$$\alpha_s = \arccos \frac{n - 0.5}{n}; \frac{v_1 D}{\lambda} = \sqrt{n(n - 0.5)}. \tag{19}$$

For the same parameters given above, the desired values now are $v_1$=0.034 and $\alpha_s$=60.0°.

Figure 6:
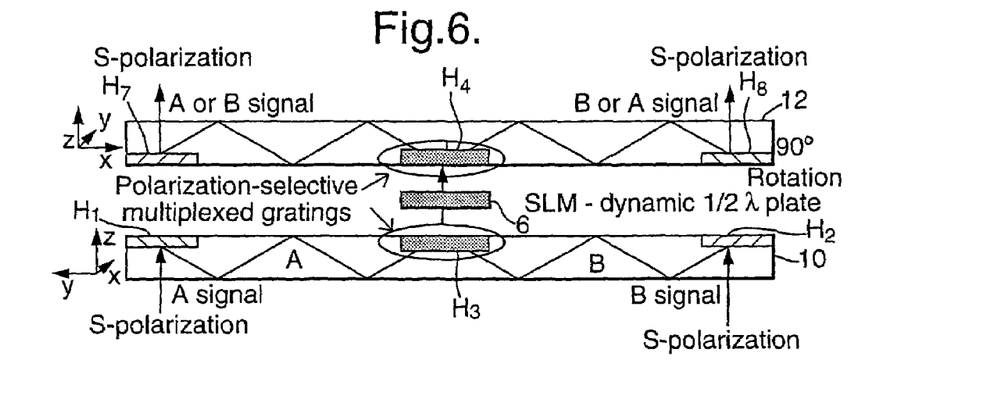
FIG. 6 is a schematic side view of the geometry of a still further embodiment of an entire optical switching device.
Figure 7:
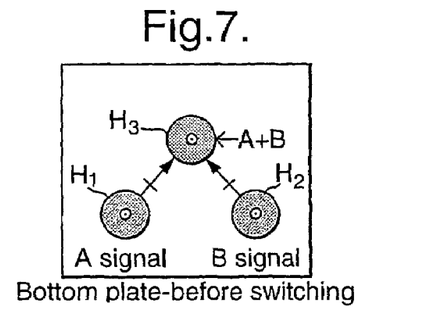
FIGS. 7 and 8 are plan views of the bottom and top surfaces, respectively, of the embodiment of FIG. 6.
Figure 8:
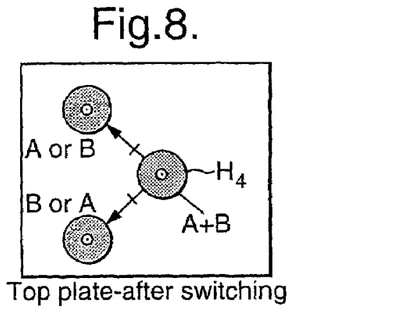

FIGS. 6 to 8 illustrate a possible embodiment for the building block of a 2×2 optical switch. Two light waves, A and B, having orthogonal polarizations s and p, are coupled into the substrate 10 by the holograms $H_1$ and $H_2$, respectively. The angle between the projection of the two waves on the substrate plane is 90° and the off-axis angle inside the substrate is set according to the solutions of Equations (18) or (19). Both light waves have an s polarization with respect to the plane of the holographic plate. The waves are multiplexed and coupled out of the plate by the hologram $H_3$, which is a: combination of two orthogonal holograms, $H_{3A}$ and $H_{3B}$. Since the angle between the two waves is 90°, their polarizations are mutually orthogonal. Hence, the hologram $H_{3A}$ can be highly efficient in blocking wave A and practically transparent to wave B. Similarly, the hologram $H_{3B}$ will be highly efficient in blocking wave B and transparent with respect to wave A. The waves then illuminate an SLM 6, which acts as a dynamic ½ λ plate, normal to its surface. After passing through the SLM 6, which either rotates the polarizations by 90° (operation mode), or has no influence on the waves (non-operation mode), the waves impinge upon the demultiplexing hologram $H_4$ in substrate 12, which is identical to $H_3$ but has the opposite effect, i.e., separating A and B into two orthogonal directions. Holograms $H_7$ and $H_8$ couple the waves out of the substrate 12. It should be noted that the axis system of the upper substrate 12 in FIG. 6 is rotated by 90° about the z axis in contrast to the axis system of the lower plate. Clearly, the two substrates 10 and 12 and the SLM 6 can easily be integrated into one piece so as to minimize the overall size of the device.

There are clear advantages to the configuration of this embodiment. The optical switch can be made very compact, and has the potential of very high efficiency and negligible cross-talk between channels. Not only Bragg holograms, but also surface-relief gratings, can be used for the polarization-sensitive element. Since the polarization of both waves is the s-polarization, a simple coating can filter out the undesired p-polarization in order to eliminate cross-talk. As shown below, a fairly simple fabrication process can be used to record the holograms. Building blocks of such configuration are very suitable for producing multi-stage devices.

It is important to note that the embodiment described with reference to FIG. 6 is merely an example of a method for coupling the input waves into a substrate. Input waves could also be coupled into a substrate by other optical means, including, but not limited to, integrated reflecting surfaces, folding prims, bundles of fiber optics, diffraction gratings, and the like. Also, in the example of FIG. 6, the input waves and the image waves are located on opposite sides of the substrate. Other configurations are envisioned in which the input and image waves can both be located on the same side of the substrate. There may even be applications in which the input waves can be coupled into the substrate through one of its edges.

Figure 9:
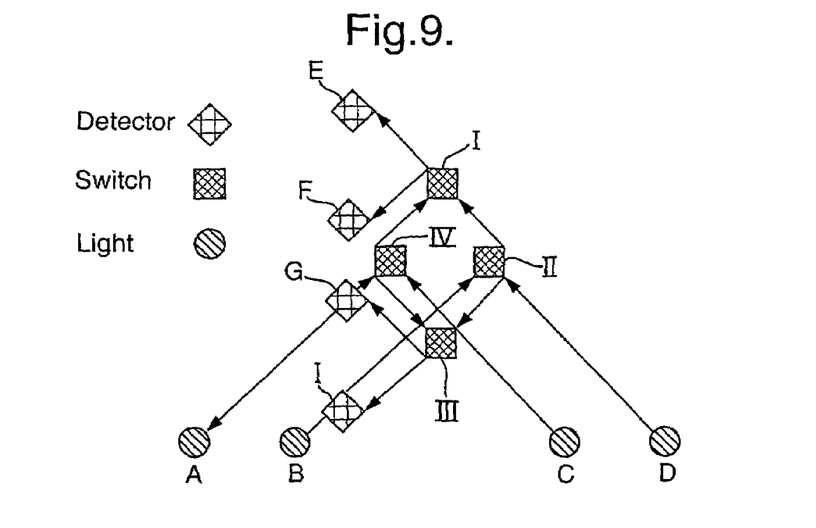
FIGS. 9 and 10, respectively, are schematic illustrations of 4×4 and 8×8 optical switching systems according to the present invention.
Figure 10:
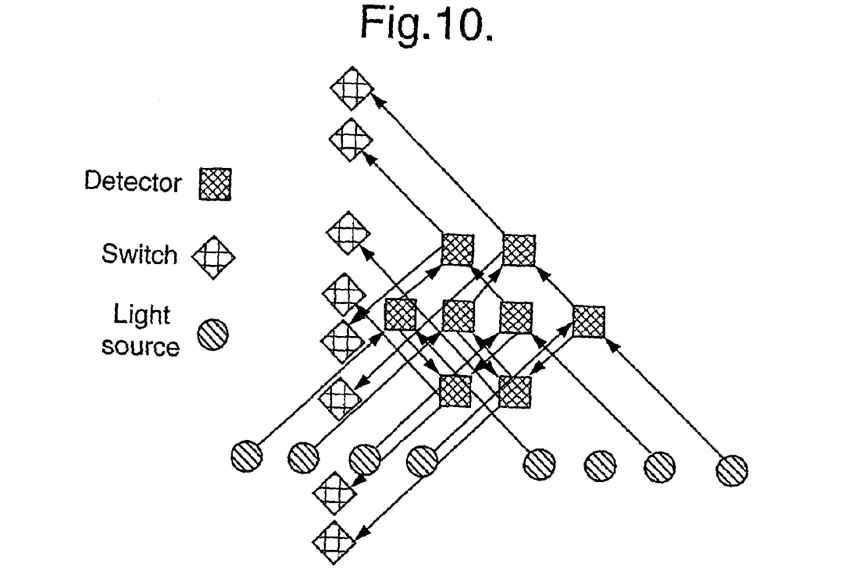

FIGS. 9 and 10 illustrate possible arrangements for 4×4 and 8×8 optical switches, respectively. Seen in FIG. 9 are the relative dispositions of the light sources A, B, C and D; the optical switches I, II, III, IB, and the detectors E, F, G and I. FIG. 10 illustrates the architecture of an 8×8 configuration without reference numbers, for clarity.

The accuracy of the recording and developing processes of the Bragg holograms is very crucial for achieving optical switches with high efficiencies and minimal cross-talk. In addition, considering the mass production of the device, an appropriate recording procedure should be developed in which a large number of holographic facets can be recorded simultaneously onto the same substrate.

Figure 11:
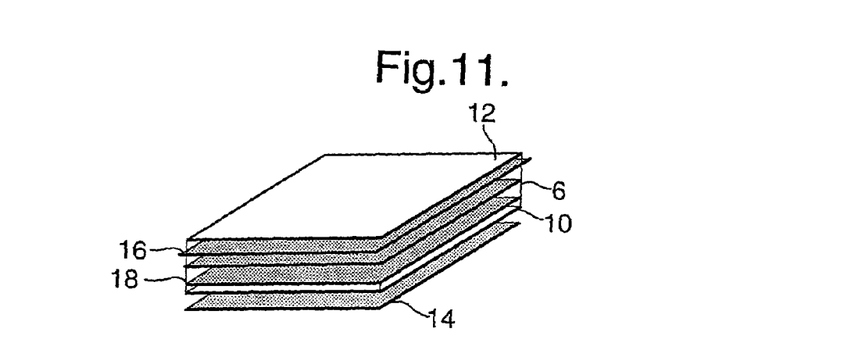
FIG. 11 is an isometric view of a planar optical switching system according to the present invention.

FIG. 11 illustrates the geometry of a switching device according to the present invention. The system consists of an opto-electronic circuit 14 and two holographic substrates 10 and 12 carrying holographic emulsion layers 16 and 18, separated by a two-dimensional array of SLM devices 6. The entire system can be very compact and compatible to utilizing VLSI architectures. Three-dimensional arrays of switching devices can likewise be arranged.

One of the more advantageous ways of achieving mass production of the device is the use of surface relief gratings that are very easy to replicate. Even with the use of Bragg holograms, a large number of holographic facets can be recorded simultaneously onto the same substrate. Hence, also with Bragg holograms, the mass production process is expected to be rather simple. It is possible to record the holographic elements one by one; however, this procedure is very long and cumbersome, and it certainly is not advantageous for mass production. Instead, a recording method is described herein which may exploit both binary optics and volume holographic elements, for relatively easy, large scale fabrication of the holographic switching devices.

Figure 12:
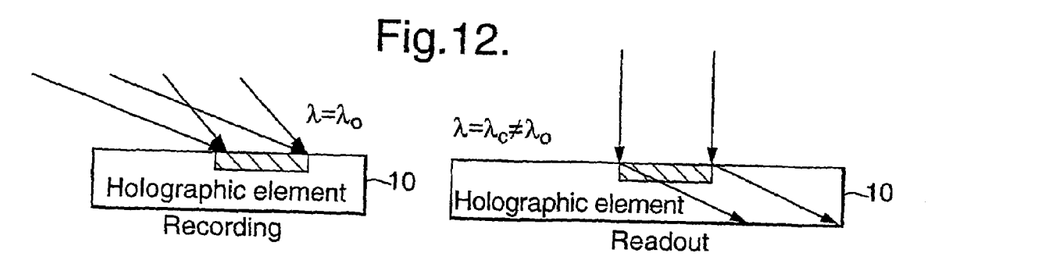
FIG. 12 illustrates a recording scheme of the final holographic element, in the presence of a wavelength shift between recording and readout.

The recording architecture of the final HOE, in the presence of a wavelength shift between recording and readout, is shown in FIG. 12. As described above, each HOE on the final holographic plate can be recorded using a pair of "parent" gratings, pre-prepared on an intermediate plate. As can be seen in FIG. 12, for each final HOE in the holographic substrate 10, the sign of the x component of the projection from the paraxial rays of the intermediate HOEs is identical for both HOEs. Hence, the n final HOEs can be divided into two groups, according to the sign of this x component. Since there is a large number of HOEs in the holographic plate, it is apparent that each group contains about n/2 elements.

Figure 13:
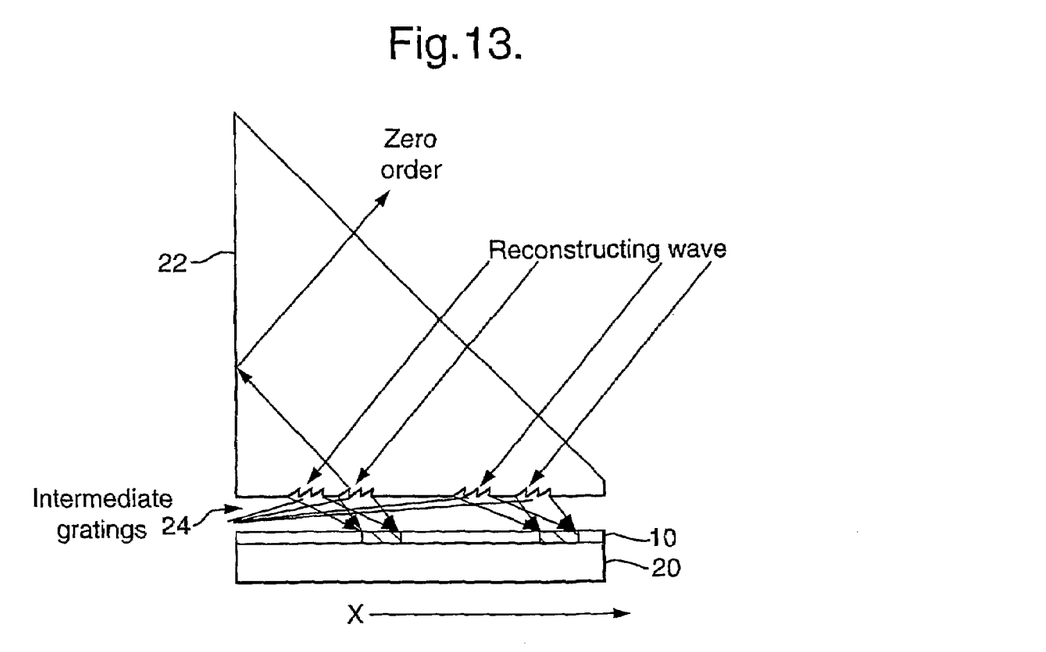
FIG. 13 is a schematic representation of a recording architecture of the final holographic element with an intermediate holographic plate.

FIG. 13 shows the recording procedure for one of these groups. (The recording geometry of the second group is similar, with opposite x components.) Seen is an intermediate holographic plate 20, carrying the final holographic substrate 10. The readout wave for all the parent gratings is a plane wave which is entered into substrate 10 through a glass prism 22 with an off-axis angle. Several other schemes, likewise employing wedge devices, are also possible.

Due to the high obliquity of the intermediate holographic plate 20, the only diffracted order is the first order. The zero order is coupled out of the prism by total internal reflections and the other orders are evanescent waves. Hence, the only order that illuminates the final holographic substrate 10 during the recording procedure is the desired first order; there is no undesired illumination from the other orders. Since the intermediate gratings 24 can be put very close to the final holographic substrate, possible overlapping between different parent gratings can also be eliminated.

The intermediate holographic plates 20 can be constructed by either one of the following methods. They can be recorded holographically, or can be fabricated directly as surface relief holograms. In both cases, the constructing procedure should be done only once for each of the intermediate holographic plates. The efficiency of the parent gratings is not a crucial point, i.e., the efficiency of these gratings need not be close to 100%; a much lower efficiency is sufficient for the procedure of recording the final plate. Hence, it is chosen to fabricate the intermediate plate as a surface relief holographic plate; only one level is necessary for these binary gratings, and their fabrication procedure is relatively simple. As for the final HOEs, it is clear that the two-step recording procedure of the final holographic plate is quite simple and can be performed with relative ease.

As mentioned above, an alternative method for fabrication of polarization-selective holograms is as surface relief gratings. High polarization-selectivity can be achieved with this approach when the angle between the readout and the image waves is 90°. For different off-axis angles, the situation is much more complicated.

Figure 14:
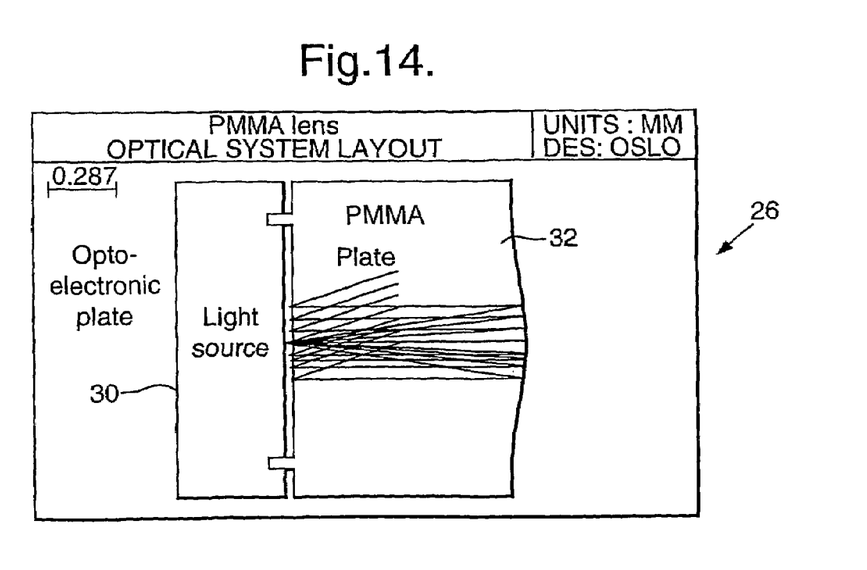
FIG. 14 illustrates a PMMA coupling element consisting of an aspherical mirror and a reflection surface relief grating.

FIG. 14 illustrates a preliminary design of a building block for an optical switching system 26 based on a surface relief grating. The light source 30 is located next to a transparent plate 32, fabricated, e.g., of PMMA polymeric material. The light wave diverging inside the plate is reflected back to the front surface by an aspherical mirror (not shown) that collimates the input beam and is reflected back again by a reflection grating that couples the light inside the substrate.

Figure 15:
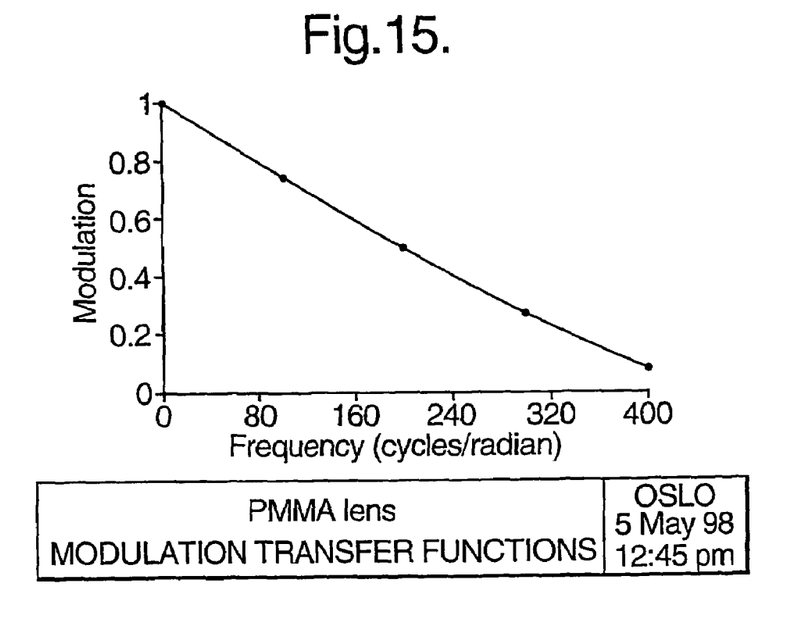
FIG. 15 is an MTF graph showing the calculated spot size of the optical system illustrated in FIG. 14.

FIG. 15 illustrates the optical performance of the above-described element. The element has a diffraction-limited performance. With minor changes, it can be used also as the building block for the polarization-selective element. Hence, the entire holographic plate can be fabricated into one monolith plate by injection molding, embossing, or other methods which are appropriate for mass production. Moreover, such an holographic plate is not only easy to duplicate, but it can also be easily integrated with the opto-electronic plate shown in FIG. 14.

As described above, there are only two gratings for each optical switch. For a system having $N=2^n$ sources, the number of optical switches for each channel is $Log_2 N=n$. Hence, the diffraction efficiency for each interconnection is $$\eta = [\phi(1-\rho)]^{2n}, \quad (20)$$

wherein:

φ is the efficiency for the s polarization, and

ρ is the efficiency for the p polarization.

For $\phi=95\%$, $\rho=5\%$ and $n=7$ (128×128 switch), the total efficiency of each channel is $$\eta = 24\%. \quad (21)$$

The overall area of the system can now be calculated. As shown in FIG. 10, for a system having $2^n$ sources, the total number of switches in each step is $2^{n-1}$. For each switch there are two holographic elements, and there are n steps in each channel. In addition, there are $2^n$ elements which couple the light waves from the sources into the optical substrate and the same number to couple the light out from the plate onto the detectors. Hence, the total number of holographic elements on a single plate is:

$$M = 2 \cdot 2^n + 2 \cdot n \cdot 2^{n-1} = (n+2)2^n. \quad (22)$$

For n=7 (128×128 switch) the number of the holographic elements is M=1152. Assuming that for each holographic element the necessary area on the holographic plate is a square of 200 μm, and that there are two separated plates, the total area of the system is in the order of 1 cm².

It will be evident to those skilled in the art that the invention is not limited to the details of the foregoing illustrated embodiments and that the present invention may be embodied in other specific forms without departing from the spirit or essential attributes thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

The invention claimed is:

1. An optical switching device, characterized by:
    a first substrate for propagating therein by multiple total internal reflections, two spaced-apart signal waves having an angle of propagation of 90° therebetween;
    at least one polarization-selective multiplexing grating for multiplexing said two signal waves together;
    at least one polarization-selective demultiplexing grating;
    a polarization rotation element acting as a dynamic ½ λ plate, optically interposed between the optical path of said multiplexing grating and said demultiplexing grating, and
    a second substrate for propagating therein by multiple total internal reflections, waves emitted by said demultiplexing grating in two directions.

2. The switching device as claimed in claim 1, further comprising means for coupling at least two signal waves into, and/or out of, said device.

3. The switching device as claimed in claim 2, wherein said coupling means couples into said first substrate two signal waves having an S polarization with respect to the plane of said substrate.

4. The switching device as claimed in claim 2, wherein said means for coupling is constituted by at least one substrate having at least one pair of polarization-selective holographic elements.

5. The switching device as claimed in claim 2, wherein said means for coupling is constituted by a reflective surface.

6. The switching device as claimed in claim 2, wherein a first of said means for coupling is arranged to diffract one signal wan into the same direction of the second signal wave, for multiplexing the two signal waves together into a single wave.

7. The switching device as claimed in claim 1, wherein said substrates extend along a single plane and said multiplexing and demultiplexing is effected within said single plane.

8. The switching device as claimed in claim 1, wherein, in an operation mode, said polarization rotation device causes said signal waves to rotate the polarization by 90° and in a non-operation mode, the device does not influence said signal waves.

9. The switching device as claimed in claim 1, further comprising a third holographic element for coupling a multiplexed wave out of said first substrate and a fourth holographic element for coupling said multiplexed wave into said second substrate.

10. The switching device as claimed in claim 1, wherein the off-axis angle a of wave propagation inside the substrates is given by the expression $$\alpha_s = \arccos \frac{n}{n+0.5}; \quad \frac{v_1 D}{\lambda} = \sqrt{n(n+0.5)}$$

wherein:
    D=the thickness of the substrates;
    $v_1$=a selected phase modulation of the refractive index of the substrates;
    $\alpha_s$=the off-axis angle inside the substrates, and
    n is a natural number.

11. The switching device as claimed in claim 1, wherein the off-axis angle of wave propagation inside the substrates is given by the expression $$\alpha_s = \arccos\frac{n-0.5}{n}; \quad \frac{v_1 D}{\lambda} = \sqrt{n(n-0.5)}$$

wherein:
- D=the thickness of the substrates;
- $v_1$=a selected phase modulation of the refractive index of the substrates;
- $\alpha_s$=the off-axis angle inside the substrates, and
- n is a natural number.

12. The switching device as claimed in claim 1, wherein said gratings are constituted by interferometrically recorded Bragg holograms.

13. The switching device as claimed in claim 1, wherein said gratings are constituted by surface relief holograms.

14. A switching system, comprising a plurality of optical switching devices as claimed in claim 1, arranged in predetermined dispositions with respect to each other so as to form an optically aligned, two- or three-dimensional array.

15. A method for producing a holographic substrate of the optical switching device according to claim 1, the critical switching device characterized by a holographic plate having a plurality of holographic elements, said method comprising the steps of:

a) defining a first intermediate holographic element;

b) defining a second intermediate holographic element located at the plane parallel to the plane of said first holographic element;

c) determining, for each holographic element, a pair of parent holograms to be formed on said intermediate elements in such a way that combining said pair of parent holograms with a pro-defined-predetermined readout wave will yield two coherent light waves wherein the interference of said two light waves in said holographic plate produces the desired final holographic effect;

d) determining the signs of the x components of the projections from the paraxial rays of said pairs of parent holograms for all of the holographic elements on said holographic plate;

e) dividing said holographic elements into two groups according to the signs of said x components;

f) producing, for each of said two groups, a different holographic plate comprising the parent holograms of the relevant holographic elements;

g) attaching the plates produced in step (t) to an optical prism in such a way that while illuminating said plates trough the prism with said predetermined readout wave, the first diffracted order from the intermediate hologram produces the desired holographic effect on the holographic plates, the zero order is coupled out of the prism by total internal reflections, and the other orders are evanescent waves, and h) repeating the recording process for each group of holographic elements as defined in steps (d) and (e).

* * * * *